Patented Aug. 17, 1943

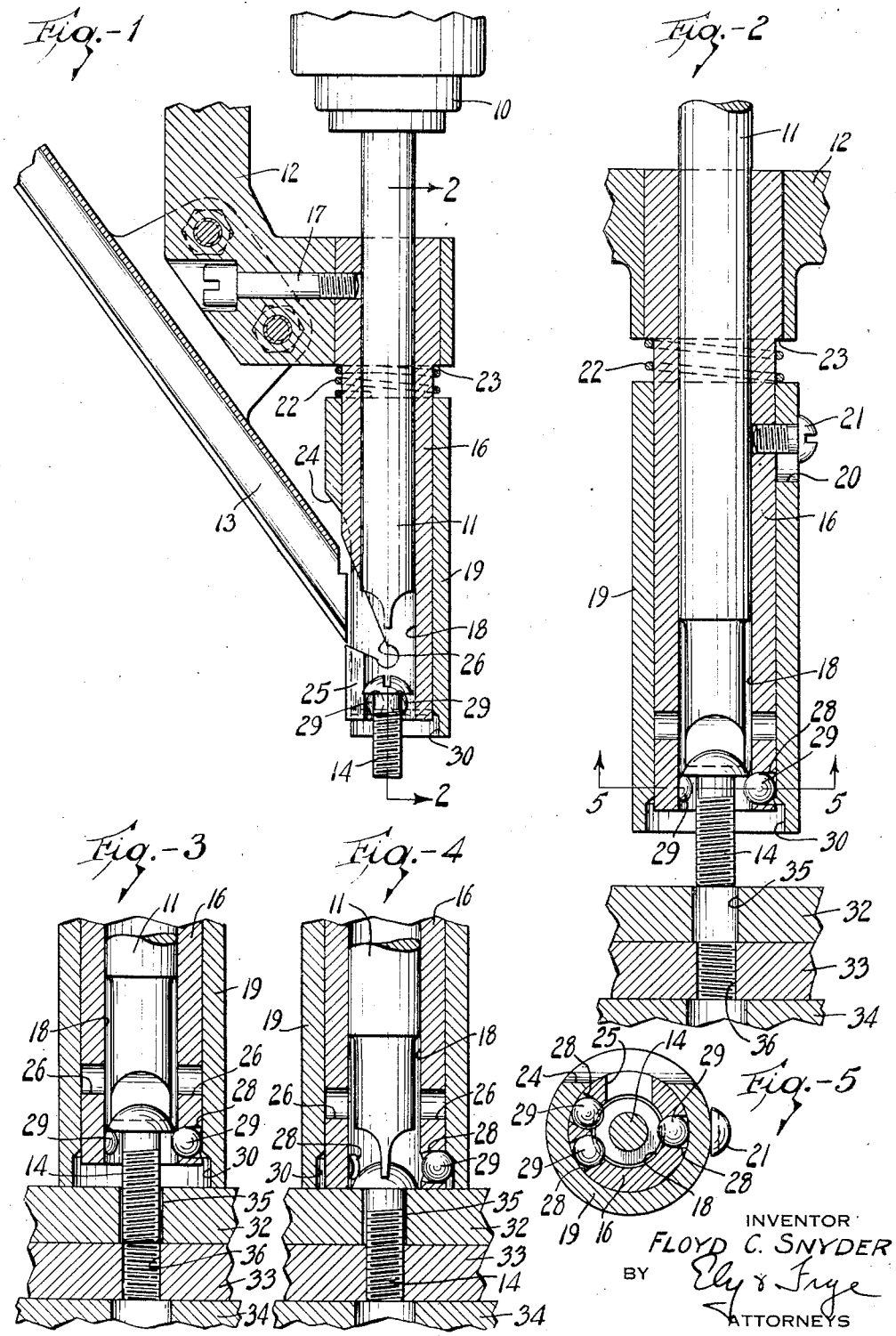

2,327,074

UNITED STATES PATENT OFFICE 2,327,074

CHUCK

Floyd C. Snyder, Akron, Ohio

Application July 26, 1940, Serial No. 347,622

4 Claims. (Cl. 144—32)

This invention relates to chucks, and more especially it relates to screw-holding chucks for use with power operated screw driving apparatus, either of the stationary or the portable type.

Chucks of the character mentioned are provided for holding a screw and keeping it in proper contact with the rotary bit or blade of the screw driver while the screw is being driven. Such chucks heretofore provided usually have yieldingly engaged and held the screw until the latter has been substantially set up, then been retracted out of engagement with the screw by being overcome by forces set up as the screw becomes fully driven. In some cases the chuck has consisted of a pair of leaf springs having free ends engaging the screw to be driven. In other cases the chuck has comprised movable jaws held in screw-engaging position by an endless coiled spring. Another type of chuck has employed spring-backed ball detents. Thus the screws frequently were held too loosely for efficient operation due to weakening of the spring members of the chucks as the result of continued use.

The chief objects of this invention are to provide an improved chuck for screw driving machines; to provide a chuck of the character mentioned that will hold a screw positively and firmly; to obviate the use of yielding members such as springs in screw-holding chucks; and to provide in a novel and superior manner for effecting release of the screws as they become fully set up. Other objects will be manifest as the description proceeds.

Of the accompanying drawing:

Figure 1 is a fragmentary sectional view of a screw driving apparatus comprising the improved chuck, and a screw held therein;

Figure 2 is a section on the line 2—2 of Fig. 1, on a larger scale, showing the parts with relation to the work as the screw is about to enter the latter.

Figure 3 is a view of the lower portion of the structure shown in Fig. 2 showing the relative positions of the elements as the screw enters the work;

Figure 4 is a view similar to Fig. 3 showing the screw fully threaded into the work; and Figure 5 is a section on the line 5—5 of Fig. 2.

Referring to the drawing, particularly Fig. 1 thereof, there is shown a portion of a screw driving machine comprising a power driven spindle 10 in which is mounted a screw driver bit 11, and a slide 12 that has limited movement parallel to the axis of the bit 11, said slide supporting a magazine or chute 13 by means of which screws 14, herein shown as machine screws, are delivered one at a time to the improved chuck constituting the subject matter of this invention. The screw driving machine per se constitutes no part of the present invention so that additional showing thereof need not appear herein. Although the improved chuck may be utilized on various makes of power operated screw driving machines, it is designed especially for use with the portable screw driving machine shown in my co-pending application for Letters Patent filed June 10, 1938, Serial No. 212,894.

The improved chuck comprises a tubular quill 16 that is secured to slide 12 by means of set screw 17, the quill being formed with an axial bore 18 in which the screw driver bit 11 is received. Slidably mounted upon the quill 16 is a sleeve 19 arranged for limited axial movement thereon. The sleeve 19 is formed with a longitudinally extending slot 20 through which freely extends a screw 21 that is threaded into the quill 16, the arrangement being such that the screw prevents angular movement of the sleeve on the quill and limits the axial movement of the sleeve relatively of the quill. Normally the sleeve 19 extends somewhat beyond the lower or free end of the quill, said sleeve being yieldingly urged to this position by a compression spring 22 that is mounted upon the quill between the upper end of sleeve 19 and a shoulder 23 formed on the quill at the region of the latter adjacent slide 12. The lower end portion of sleeve 19, on the side thereof that confronts the magazine 13, is tangentially cut away at 24 to expose the quill 16 therein, and the portion of the quill thus exposed is formed with a central longitudinal slot 25 at its lower end, the wall of the quill at the upper end of slot 25 being cut back as shown at 26, Fig. 1, at each side of said slot. The arrangement is such that the slot 25 constitutes, in effect, a continuation of the slot in the bottom of the magazine 13, so that screws 14 released from the latter may enter the bore 18 of quill 16. Release of screws 14 from the magazine is effected by movement of the slide 12 relatively of the spindle 10, and the screws move into the quill 16 of the chuck while the latter and the screw driver bit 11 are in the relative positions shown in Fig. 1, in which positions the lower end of the bit does not obstruct the slot 25 of the quill.

It is necessary that means be provided for retaining a screw 14 in the lower end of the quill after it has been deposited therein and to this end the quill is formed with a plurality, herein shown as three in number, of radial bores 28, 28 disposed near the lower end thereof. Mounted in the bores 28 are respective hardened, polished steel balls 29, such as ball bearings, the inner ends of the bores 28 being locally constricted or peened over to prevent the balls from passing therethrough completely into the axial bore 18 of the quill. As shown in Figs. 2, 3 and 5, the balls 29 normally project partly into the axial bore of quill 16 and thus obstruct the passage of a screw from the lower end thereof by engagement with the head of the screw. This condition obtains at all times that the sleeve 19 is in its lowermost position on the quill under the impetus of spring 22, the sleeve thereby closing the outer ends of the bores 28. The lower end of sleeve 19 is counterbored and countersunk at 30 so as to be locally of substantially larger inside diameter than the outside diameter of the quill. Normally the counterbore 30 is disposed beyond the radial bores 28 of the quill, but under some circumstances the sleeve 19 is moved axially of the quill 16 against the force of spring 22, to bring the counterbore 30 opposite the outer ends of bores 28, with the result that balls 29 are enabled to move radially outwardly in said bores a limited distance so they no longer project into the bore 18 of the quill, as is best shown in Fig. 4. In this position the balls no longer obstruct the passage of the head of screw 14 through said bore.

The operation of the chuck as described is fully automatic in operation as will be apparent from reference to Figs. 2, 3 and 4 wherein a typical operative cycle of the apparatus is shown. Said figures show how the screw driver operates to join two work-pieces 32, 33 by means of a screw 14, said work-pieces resting upon a support 34, the work-piece 32 being formed with an aperture 35 and the work-piece 33 being formed with a screw-receiving threaded bore 36 in alignment with said aperture 35. After the slide 12 and magazine 13 have been moved relatively of the rotating bit 11 to deliver a screw 14 to the chuck, as shown in Fig. 1, said elements are moved back to the normal operating position shown in Fig. 2 wherein the bit engages the driving slot of the screw, the latter being securely held in position by the balls 29. The apparatus is then brought into juxtaposition to the work, the screw 14 is passed through aperture 35 of work-piece 32 and threaded into bore 36 of work-piece 33. As the screw moves axially into bore 36, the chuck holding the screw moves toward work-piece 32, and engages the latter, as shown in Fig. 3, before the screw is fully set up. Thereupon axial movement of the sleeve 19 ceases, but the bit 11 and quill 16 continue to move axially, with the result that the radial bores 28 of the quill move into the region of the counterbore 30 of the sleeve, and the balls 29 in said bores are forced outwardly, out of the path of the head of screw 14, as shown in Fig. 4. Thus the bit 11 is enabled to drive the screw axially to its fully set up position, during which the bit may move axially relatively of the quill a short distance after the quill engages the work-piece 32.

The chuck is fully automatic in its operation, it holds a screw firmly preparatory to the screw driving operation, and it achieves the other advantages set out in the foregoing statement of objects.

Modification may be resorted to without departing from the spirit of the invention or the scope thereof as defined by the appended claims.

What is claimed is:

1. In a chuck for screw driving apparatus, the combination of a tubular quill positioned about the screw driver bit and movable axially relatively thereof, radially extending bores through the lower end portion of said quill, respective ball detents in said bores adapted to project partly into the axial bore of the quill to retain a screw therein, the inner ends of said radial bores being slightly constricted to prevent the balls from completely passing therethrough, and a sleeve slidably mounted on the quill and having limited axial movement relatively thereof, said sleeve extending over said radial bores and normally engaging said balls to hold them positively partly within the axial bore of the quill, said sleeve having a local region of increased inside diameter, which region is disposed opposite the outer ends of the radial bores of the quill in one position of the sleeve to enable the ball detents to move outwardly in their bores and thus to release a screw, said sleeve normally extending beyond the lower end of the quill so as to be moved relatively of the latter by engagement with the work before the screw is fully driven.

2. A combination as defined in claim 1, including a compression spring urging the sleeve toward normal position.

3. In a chuck for screw driving apparatus, the combination of a tubular quill positioned about a screw driver bit and movable axially relatively thereof, radially extending bores through the lower end portion of said quill, the inner ends of said bores being somewhat constricted, respective ball detents in said bores adapted to project partly into the axial bore of the quill to retain a screw therein, a sleeve slidably mounted upon said quill and normally engaging said balls and positively holding them partly within the axial bore of the quill, said sleeve formed with a longitudinally extending slot, a member extending through said slot and fixed in the quill for limiting axial movement of the sleeve relatively of the quill and for preventing relative angular movement therebetween, a compression spring urging the sleeve toward a normal position wherein the lower end of the sleeve projects beyond the quill, the said projecting portion of the sleeve being of increased inside diameter, which region is opposite the outer ends of the radial bores of the quill when the sleeve is moved against the force of said spring to an alternative position, thereby enabling the ball detents to move outwardly in their bores to release the screw.

4. A combination as defined in claim 3 in which the sleeve and quill have aligned longitudinally extending openings in one side thereof to enable screws to be passed into the axial bore of the quill above the ball detents therein.

FLOYD C. SNYDER.